(12) United States Patent
Chu

(10) Patent No.: US 12,504,324 B2
(45) Date of Patent: Dec. 23, 2025

(54) COMPOSITE CALIBRATION PLATE

(71) Applicant: CHROMA ATE INC., Taoyuan (TW)

(72) Inventor: Chien-Hsun Chu, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 214 days.

(21) Appl. No.: 18/400,686

(22) Filed: Dec. 29, 2023

(65) Prior Publication Data

US 2024/0219229 A1 Jul. 4, 2024

(30) Foreign Application Priority Data

Dec. 29, 2022 (TW) .................. 111150655

(51) Int. Cl.
*G01J 1/42* (2006.01)
*C12Q 1/6848* (2018.01)

(52) U.S. Cl.
CPC .......... *G01J 1/4228* (2013.01); *C12Q 1/6848* (2013.01)

(58) Field of Classification Search
CPC ............. G01J 1/4228; C12Q 1/6848; G01N 2021/6417; G01N 2201/0626; G01N 2201/0627; G01N 21/6456; G01N 21/278
See application file for complete search history.

(56) References Cited

U.S. PATENT DOCUMENTS

| 2004/0036868 A1* | 2/2004 | Jones | ............... G01N 21/278 356/243.1 |
| 2005/0287040 A1* | 12/2005 | Giebeler | ............ G01N 21/278 422/400 |

\* cited by examiner

*Primary Examiner* — Georgia Y Epps
*Assistant Examiner* — Monica T Taba
(74) *Attorney, Agent, or Firm* — Muncy, Geissler, Olds & Lowe, P.C.

(57) ABSTRACT

A composite calibration plate includes a control board, a light detection board, a diffusion board, a light-emitting sheet, and a fluorescent sheet. The control board has a first setting surface and a second setting surface. The light detection board is stacked on the first setting surface. The diffusion board is stacked on the light detection board. The light-emitting sheet is stacked on the second setting surface and includes a plurality of self-luminous sources. The fluorescent sheet is optionally stacked on the light-emitting sheet or the diffusion board, and has a plurality of fluorescent chips. When calibrating the lighting device, the fluorescent sheet is disposed on the light-emitting sheet; and, when calibrating the imaging device, the fluorescent sheet is disposed on the light-emitting sheet, such that the fluorescent sheet is located at a focus position of an optical imaging path.

6 Claims, 10 Drawing Sheets

COMPOSITE CALIBRATION PLATE

This application claims the benefit of Taiwan Patent Application Serial No. 111150655, filed on Dec. 29, 2022, the subject matter of which is incorporated herein by reference.

BACKGROUND OF THE INVENTION

(1) Field of the Invention

The invention relates to a composite calibration plate, and more particularly to a composite calibration plate that can be used for calibrating a fluorescent detection device.

(2) Description of the Prior Art

In molecular biology, polymerase chain reaction (PCR) technology is often used to amplify DNA fragments of specific sequences. However, since the traditional PCR detection method requires electrophoresis, gel staining, coloring and other steps after the DNA polymerization chain reaction to observe the target DNA fragment for further quantification, the whole process is very time-consuming and laborious. Therefore, a real-time polymerase chain reaction (RT-PCR) was derived.

RT-PCR is a method that uses fluorescent dyes to detect the total amount of products after each PCR cycle in a DNA amplification reaction, and so fluorescent detection equipment is usually required. Generally speaking, existing fluorescence detection equipment mostly uses fluorescent standard reagents as tools to evaluate the specifications of detection equipment. However, such tools are susceptible to environmental temperature and humidity, chemical instability, photobleaching, etc., most of which require special storage methods. However, constant temperature refrigeration and refrigeration equipment, coupled with their short validity periods, demonstrate obviously many restrictions upon related use.

As described above, among the existing technologies, U.S. Pat. No. 8,704,158 proposes to replace reagents with fluorescent minerals to avoid storage and aging problems encountered while in using fluorescent standard reagents. However, this type of fluorescent standard film is feasible for use in monitoring detection and evaluating fluorescence detection performance, but the fluorescence uniformity of the measurement system is hard to corrected. Generally, the uniformity is mainly affected by the instability of the lighting, loss of light at lens, and different responses at various locations on the sensor.

SUMMARY OF THE INVENTION

In view of prior art, the conventional fluorescent detection device is mainly to utilize the fluorescent standard reagents to calibrate parameters of the fluorescent detection device, such as the illumination uniformity and the fluorescence uniformity, but the fluorescent standard reagents did have problems in storage. Though the new technique introduces the fluorescent minerals to replace the reagents, yet the fluorescent minerals can't be used to calibrate the fluorescence uniformity of the detection system. Accordingly, it is an object of the present invention to provide a composite calibration plate that can be used to calibrate the illumination uniformity and the fluorescence uniformity of the fluorescent detection device.

In accordance with the present invention, a composite calibration plate is configured for calibrating a lighting device and an imaging device disposed inside a fluorescent detection device. The lighting device includes a plurality of built-in light sources arranged in a light-source array. The composite calibration plate is disposed on an optical imaging path of the imaging device. The composite calibration plate includes a control board, a photo detect board, a diffusion board, a light-emitting sheet and a fluorescent sheet.

The control board has oppositely a first setting surface and a second setting surface. The photo-detect board, stacked on the first setting surface, is connected electrically with the control board. The diffusion board is stacked on the photo-detect board by being away from the control board.

The light-emitting sheet, stacked on the second setting surface, is connected electrically with the control board, includes a plurality of self-luminous sources arranged in the light-source array, and is configured for being controlled by the control board to project a plurality of self-luminous light beams.

The fluorescent sheet, selectively stacked on the light-emitting sheet by being away from the control board or the diffusion board, is furnished with a plurality of fluorescent chips disposed according to the light-source array, and configured for projecting a plurality of fluorescent light beams while being irradiated by the plurality of self-luminous light beams.

While in calibrating the lighting device, the fluorescent sheet is disposed on the light-emitting sheet by being away from the control board. While in calibrating the imaging device, the fluorescent sheet is disposed on the light-emitting sheet by being away from the control board so as to have the fluorescent sheet to be located at a focus position of the optical imaging path. While in calibrating an emission filter of the lighting device, the fluorescent sheet is disposed on the diffusion board by being away from the photo-detect board so as to maintain the light-emitting sheet at the focus position (i.e., the same position as the previous focus position).

In one embodiment of the present invention, the photo-detect board further includes a detect-board body and a plurality of photosensitive elements, the detect-board body is stacked on the first setting surface, the plurality of photosensitive elements are disposed on the detect-board body by being away from the control board.

Preferably, the diffusion board further includes a diffusion-board body and a plurality of diffusion sheets, and the diffusion-board body is stacked on the detect-board body by being away from the control board and furnished with a plurality of transparent holes; wherein, when the diffusion-board body is stacked on the detect-board body, the plurality of photosensitive elements are individually protruded correspondingly into the plurality of transparent holes, and the plurality of diffusion sheets are individually and correspondingly disposed into the plurality of transparent holes, such that, while in calibrating the lighting device, a plurality of illumination beams projected individually from the plurality of built-in light sources irradiate uniformly the plurality of photosensitive elements via the plurality of diffusion sheets.

In one embodiment of the present invention, the light-emitting sheet further includes a luminous layer and a diffusion lightening layer. The luminous layer, stacked on the second setting surface, has a plurality of self-luminous sources configured for projecting the plurality of self-luminous light beams. The diffusion lightening layer is disposed on the luminous layer by being away from the control board and on individual projection paths corresponding the plurality of self-luminous light beams, so as to reduce a light intensity of the plurality of self-luminous light beams and to have the plurality of self-luminous light beams to uniformly project.

In one embodiment of the present invention, the fluorescent sheet further includes a fluorescent-sheet body optionally stacked on the light-emitting sheet by being away from the control board or the diffusion board with respect to the photo-detect board, and the fluorescent-sheet body is furnished with a plurality of fluorescent-sheet holes, and the plurality of fluorescent chips are individually disposed on the plurality of fluorescent-sheet holes.

As stated, since the composite calibration plate of this present invention mainly utilizes the photo-detect board to detect the illumination of each built-in light source of the lighting device, such that the illumination correction coefficient of each built-in light source can be derived. In addition, the composite calibration plate of this invention can choose different dispositions to focus the fluorescent sheet to the focus position, so as to obtain the fluorescent correction coefficient of each the fluorescent chip. Thereupon, the illumination correction coefficient and the fluorescent correction coefficient can be used to adjust the fluorescent image obtained through practical measurement.

All these objects are achieved by the composite calibration plate described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a composite calibration plate. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
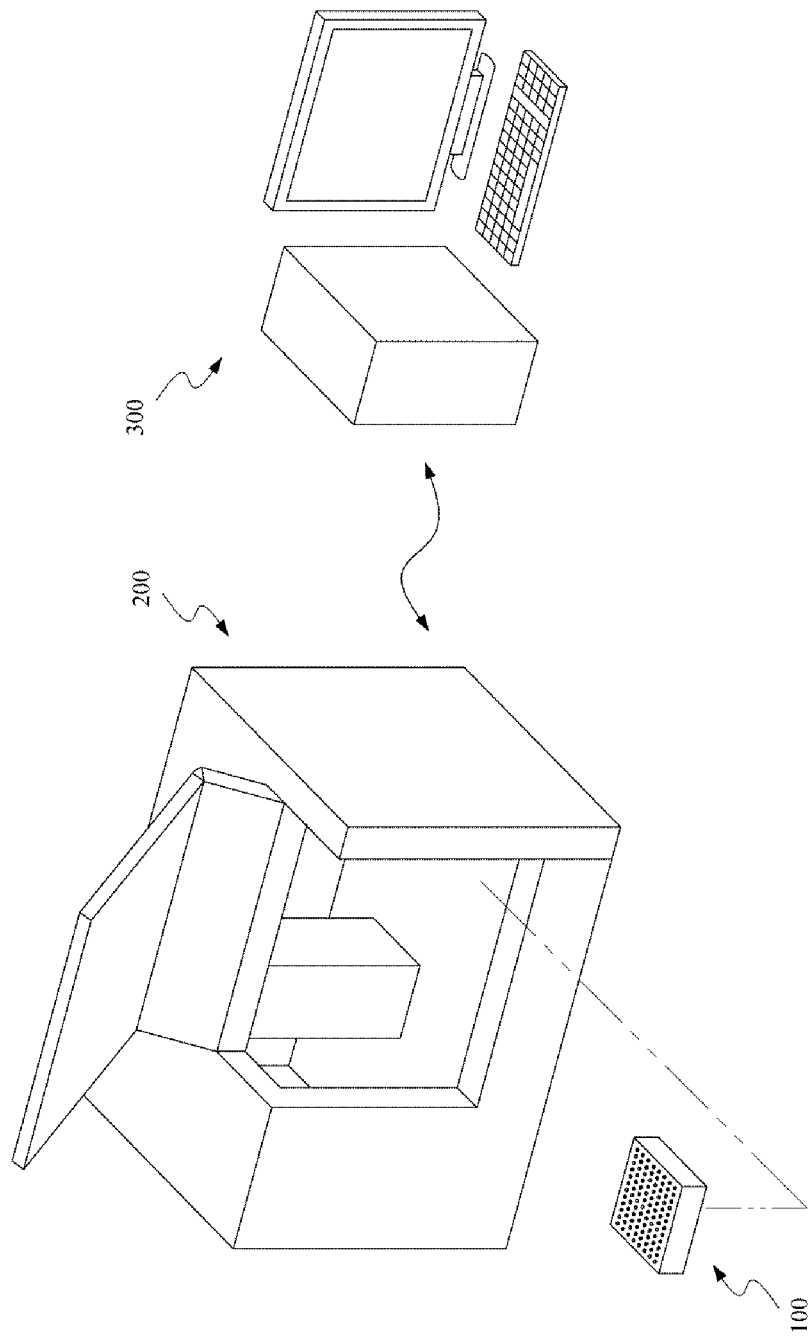
FIG. 1 is a schematic view of an application of the composite calibration plate on a fluorescent detection device in accordance with this disclosure.
Figure 2:
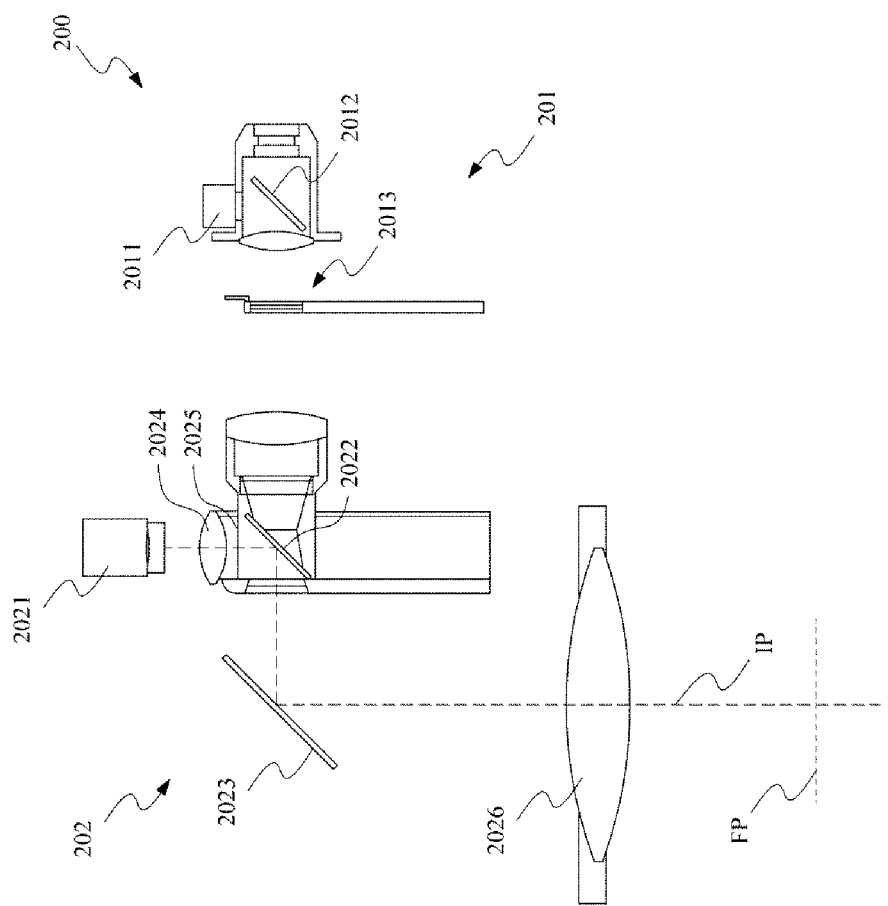
FIG. 2 is a schematic view of the fluorescent detection system built in the fluorescent detection device in accordance with this disclosure.

Refer to FIG. 1 and FIG. 2; where FIG. 1 is a schematic view of an application of the composite calibration plate on a fluorescent detection device in accordance with this disclosure, and FIG. 2 is a schematic view of the fluorescent detection system built in the fluorescent detection device in accordance with this disclosure.

As shown in FIG. 1 and FIG. 2, a composite calibration plate 100 provided in accordance with this disclosure is applied to a fluorescent detection device 200, and the fluorescent detection device 200 is electrically connected with a computer main frame 300.

The fluorescent detection device 200 is furnished thereinside with a fluorescent detection system (not shown in the figure), and the fluorescent detection system includes mainly a lighting module 201 and an imaging module 202. The lighting module 201 includes a lighting device 2011, a reflector 2012 and an excitation filter 2013. The imaging module 202 includes an imaging device 2021, a spectroscope 2022, a reflector 2023, a read lens 2024, an emission filter 2025 and a field lens 2026.

As described above, the lighting device 2011 can further include a plurality of built-in light sources (not shown in the figure) arranged in a light-source array. The reflector 2012, disposed on a light path of the lighting device 2011, is configured for reflecting a plurality of illumination beams from the plurality of built-in light sources to penetrate through the excitation filter 2013, such that the illumination beams can be purified after passing through the excitation filter 2013, and as such the background noise during a fluorescent lighting measurement can be reduced. In this embodiment, the light-source array can be a 8×12 array. On the other hand, after passing the read lens 2024 and the emission filter 2025, an optical imaging path IP of the imaging device 2021 would be reflected by the spectroscope 2022 and the reflector 2023, and then focused by the field lens 2026 to a focus position FP to be imaged.

In addition, excitation beams emitted by the lighting module 201 would pass through the read lens 2024 and the emission filter 2025, then move to irradiate the spectroscope 2022. After passing through the spectroscope 2022, the excitation beams would be reflected by the reflector 2023 to reach the field lens 2026, so as to irradiate the object (not shown in the figure) disposed on the focus position FP. After the object is irradiated by the excitation beams, the fluorescent material in the object would be excited by the excitation beams to generate the fluorescent light, so that the imaging device 2021 can capture a fluorescent image.

Figure 3:
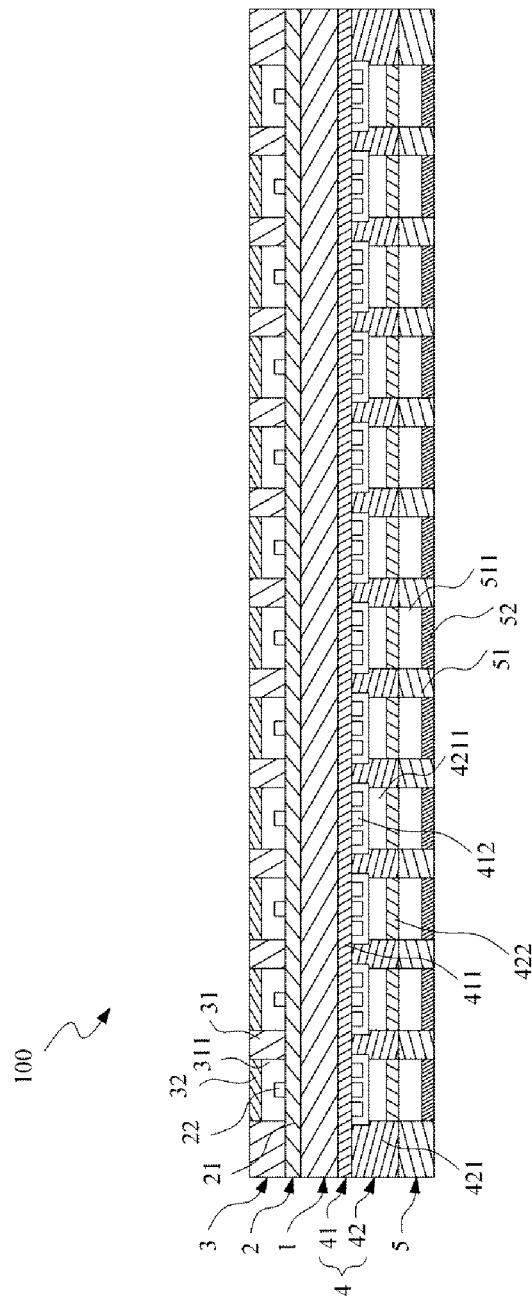
FIG. 3 is a schematic planar view of an arrangement of an application of the composite calibration plate in calibrating the illumination uniformity in accordance with this disclosure.
Figure 4:
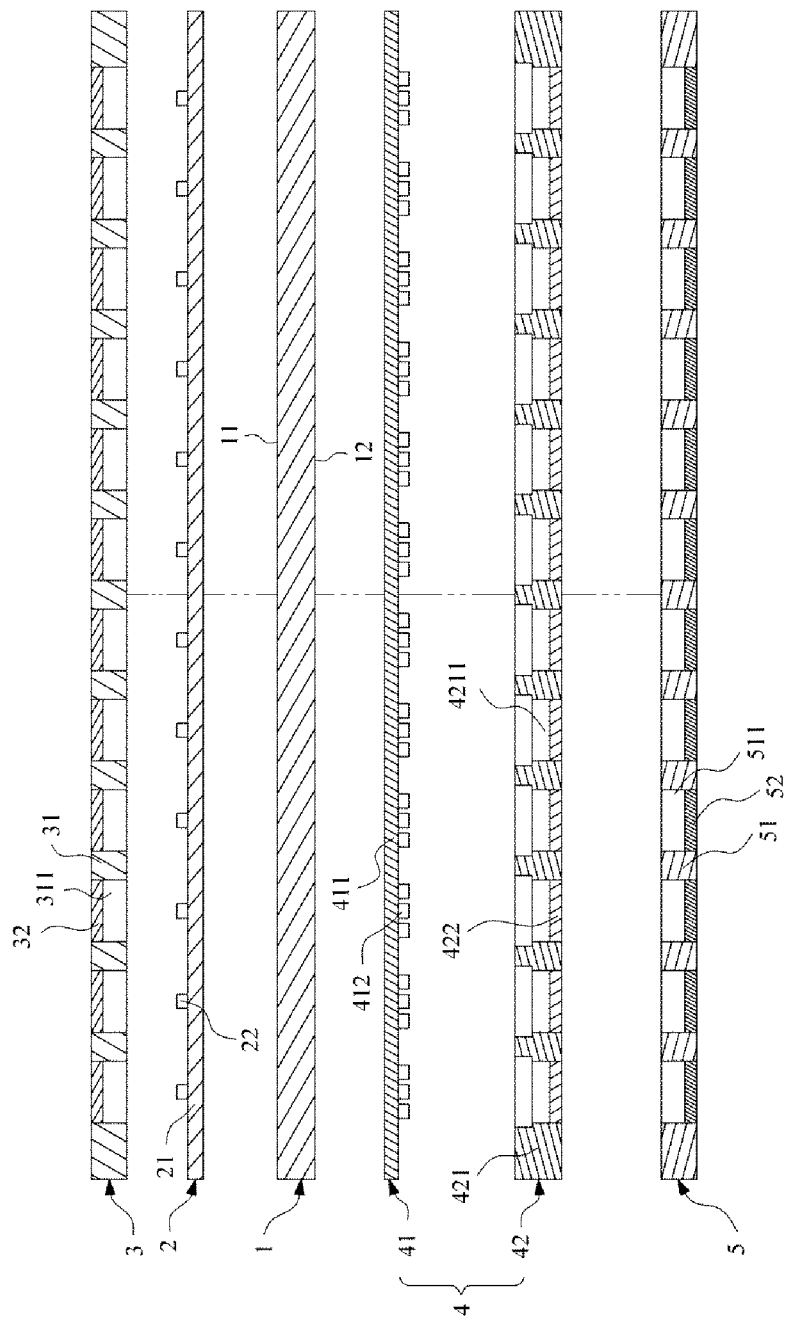
FIG. 4 is a schematic planar exploded view of the composite calibration plate of FIG. 3.

Refer to FIG. 3 and FIG. 4; where FIG. 3 is a schematic planar view of an arrangement of an application of the composite calibration plate in calibrating the illumination uniformity in accordance with this disclosure, and FIG. 4 is a schematic planar exploded view of the composite calibration plate of FIG. 3.

As shown in FIG. 1 to FIG. 4, the composite calibration plate 100 includes a control board 1, a photo-detect (PD) board 2, a diffusion board 3, a light-emitting sheet 4 and a fluorescent sheet 5.

The control board 1 has oppositely a first setting surface 11 and a second setting surface 12. Practically, the control board 1 is an electric circuit board, and the control board 1 can communicate signally with a foreign device in a wireless or cable manner (for example, use a blueteeth to connect the aforesaid computer main frame 300), so as to generate control signals purposely.

The photo-detect board 2 includes a detect-board body 21 and a plurality of photosensitive elements 22 (one labeled in the figure). The detect-board body 21 is stacked on the first setting surface 11 and connected electrically with the control board 1. A plurality of photosensitive elements 22 are disposed on the detect-board body 21 by being away from the control board 1. In this embodiment, the photosensitive elements 22 can be arranged in accordance with the aforesaid light-source array, and thus the photosensitive elements 22 would be a 8×12 array.

The diffusion board 3 includes a diffusion-board body 31 and a plurality of diffusion sheets 32 (one labeled in the figure). The diffusion-board body 31 is stacked on the detect-board body 21 by being away from the control board 1, and furnished with a plurality of transparent holes 311 (one labeled in the figure). The plurality of diffusion sheets 32 are individually disposed into a plurality of transparent holes 311. When the diffusion-board body 31 is stacked on the detect-board body 21, the photosensitive element 22 is protruded into the corresponding transparent hole 311.

The light-emitting sheet 4 includes a luminous layer 41 and a diffusion lightening layer 42. The luminous layer 41 includes a luminous-layer body 411 and a plurality of self-luminous sources 412 (one labeled in the figure). The luminous-layer body 411 is stacked on the second setting surface 12, and connected electrically with the control board 1. A plurality of self-luminous sources 412 are disposed in the light-source array on the luminous-layer body 411 by being away from the control board 1, and connected electrically to the control board 1 via the luminous-layer body 411, so as to be controlled by the control board 1 to project a plurality of self-luminous light beams (not shown in the figure).

The diffusion lightening layer 42 includes a diffusion-lightening-layer body 421 and a plurality of diffusion-lightening sheet 22 (one labeled in the figure). The diffusion-lightening-layer body 421 is stacked and disposed on the luminous-layer body 411 by being away from the control board 1, and furnished with a plurality of diffusion-lightening-layer holes 4211 (one labeled in the figure). When the diffusion-lightening-layer body 421 is stacked on the luminous-layer body 411, a plurality of self-luminous sources 412 are individually protruded into the corresponding diffusion-lightening-layer holes 4211. In this embodiment, the self-luminous source 412 can be an LED, and each of the diffusion-lightening-layer holes 4211 are correspondingly provided with three self-luminous sources 412 defined correspondingly to emit red light, green light and blue light, such that visible light of any arbitrary wavelength can be modulated.

The plurality of diffusion-lightening sheets 422 are individually and correspondingly disposed into a plurality of diffusion-lightening-layer holes 4211 so as to be on a projection path (not shown in the figure) of each the self-luminous light beam, to reduce a light intensity of the self-luminous light beams, and thus to project the self-luminous light beams uniformly.

The fluorescent sheet 5 includes a fluorescent-sheet body 51 and a plurality of fluorescent chips 52 (one labeled in the figure). The fluorescent-sheet body 51 is detachably stacked on the light-emitting sheet 4 by being away from the control board 1, but not limited thereto. The fluorescent-sheet body 51 can be also detachably stacked on the diffusion board 3 by being away from the photo-detect board 2. In addition, the fluorescent-sheet body 51 can be furnished with a plurality of fluorescent-sheet holes 511 (one labeled in the figure).

The plurality of fluorescent chips 52 are individually disposed in a plurality of fluorescent-sheet holes 511. When the fluorescent-sheet body 51 is stacked on the light-emitting sheet 4, a plurality of fluorescent chips 52 are irradiated by a plurality of self-luminous light beams to project a plurality of fluorescent light beams. In this embodiment, the fluorescent chip 52 can be made of opal or various phosphors. In practice, users can select fluorescent materials whose emission spectra cover different wavebands according to actual needs.

Figure 5:
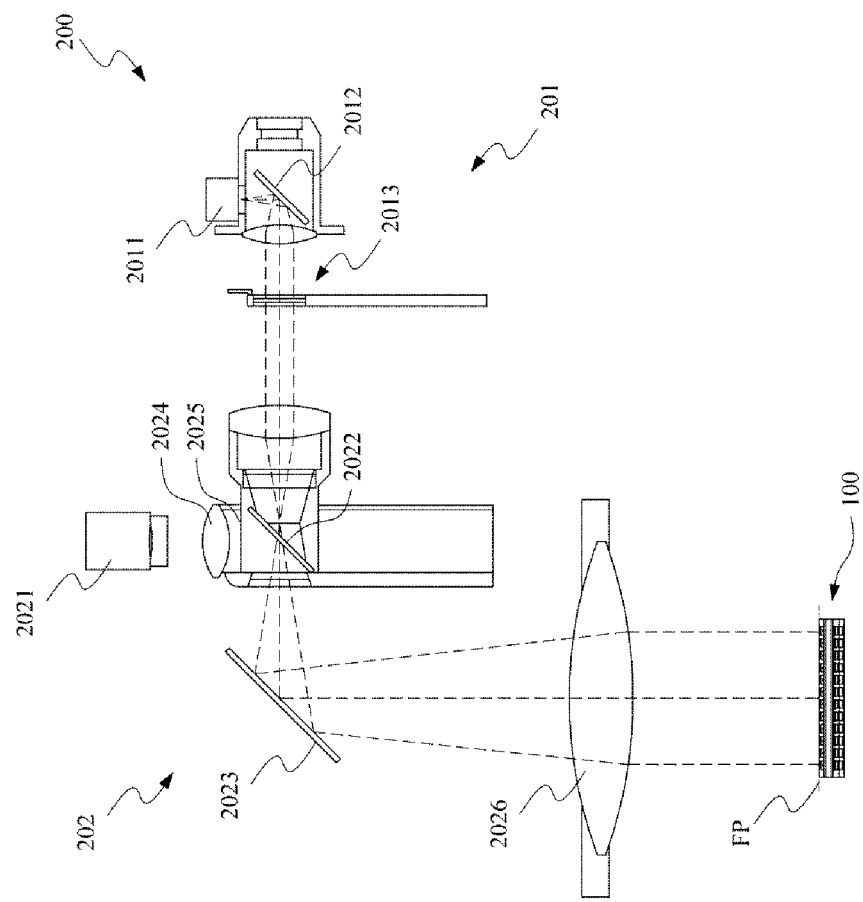
FIG. 5 is a schematic view showing that the fluorescent detection system utilizes the composite calibration plate of FIG. 3 to perform calibration of illumination uniformity upon the lighting device.

Referring to FIG. 5, a schematic view shows that the fluorescent detection system utilizes the composite calibration plate of FIG. 3 to perform calibration of illumination uniformity upon the lighting device. As shown in FIG. 1 to FIG. 5, when the fluorescent sheet 5 is stacked on the light-emitting sheet 4 by being away from the control board 1, the composite calibration plate 100 can be applied to calibrate the lighting device 2011.

As described above, in practical calibrating, the built-in light source of the lighting device 2011 would project a plurality of illumination beams to pass through the reflector 2012, the excitation filter 2013, the spectroscope 2022, the reflector 2023 and the field lens 2026, and finally to reach the composite calibration plate 100. At this time, since the composite calibration plate 100 is arranged according to the combination shown in FIG. 3, the diffusion board 3 would be aligned with the focus position that can properly receive the illumination beams. Further preferably, the diffusion board 3 can be directly placed at the focus position FP. In the present invention, the focus position FP can be preset according to prior detection or calibration records, or can be obtained through the calibrating upon the imagining device. Thus, according to the present invention, the illumination beams would irradiate the diffusion sheet 32 of the diffusion board 3, and further uniformly to the photosensitive elements 22 in the corresponding transparent holes 311.

In practical application, when the photosensitive elements 22 are irradiated, corresponding photoelectric signals would be generated due to illumination, and be sent to the control board 1 via the detect-board body 21. The control board 1 would forward the photoelectric signals to the computer main frame 300. In addition, while in a practical calibration process, a plurality of built-in light sources of the lighting device 2011 can be lighted up in sequence. Since the plurality of built-in light sources are arranged in the light-source array, thus a plurality of illumination correction coefficients k(i,j) corresponding to the light-source array would be generated. Each of the illumination correction coefficients k(i,j) is derived by dividing the maximum illumination measured by the illumination at each location, in which i and j are corresponding to different positions in the light-source array. For example, if the light-source array is a 8×12 array, then i=1~8, and j=1~12.

Figure 6:
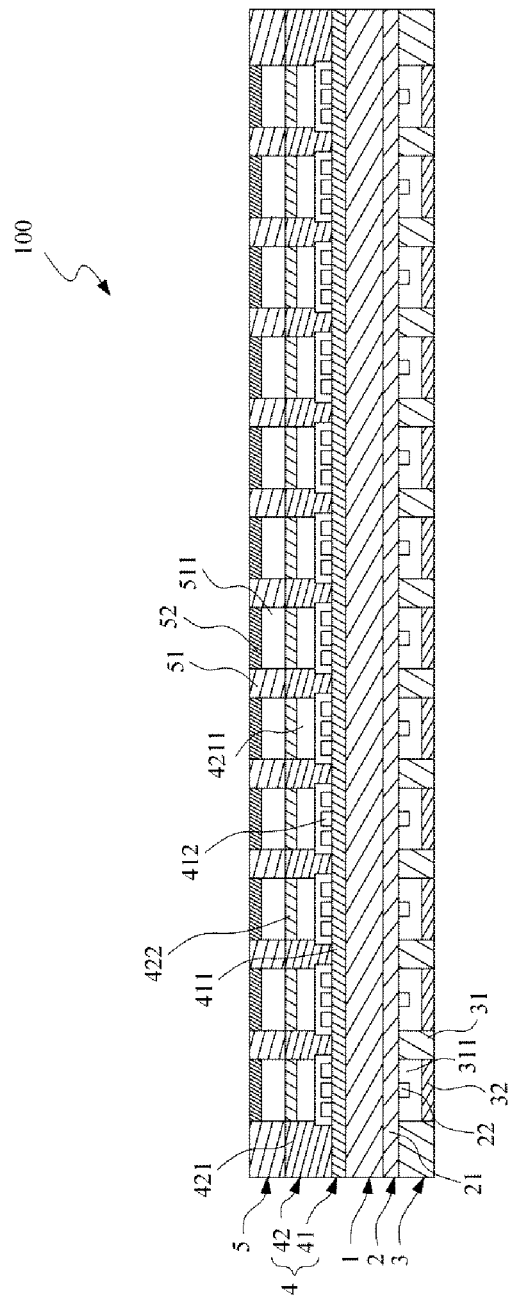
FIG. 6 is a schematic planar view of an arrangement of an application of the composite calibration plate in calibrating the illumination uniformity of the imaging device in accordance with this disclosure.
Figure 7:
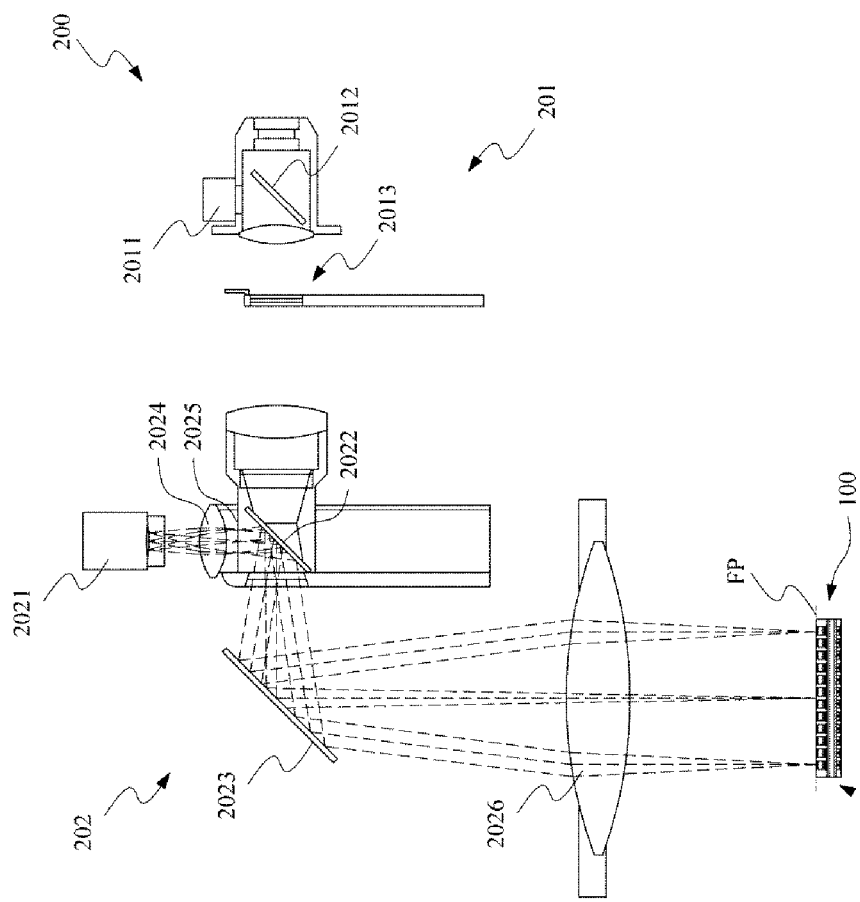
FIG. 7 is a schematic view showing that the fluorescent detection system utilizes the composite calibration plate of FIG. 6 to perform calibration of fluorescence uniformity upon the imaging device.
Figure 8:
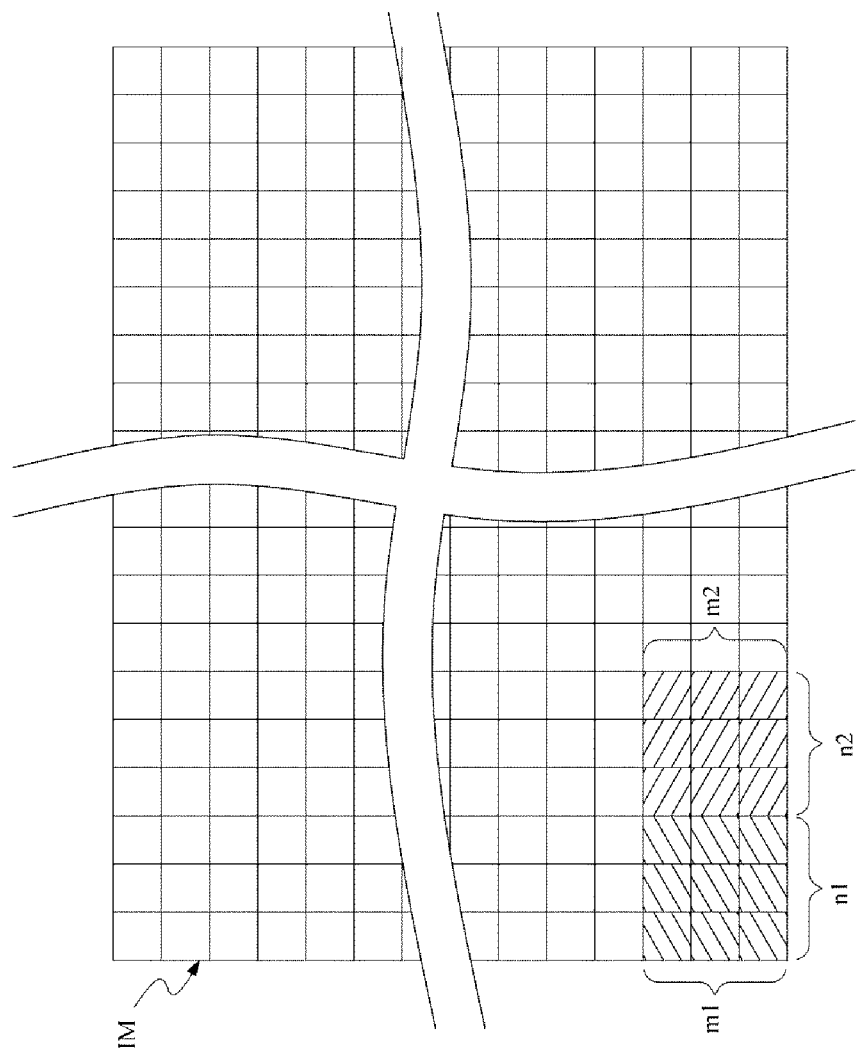
FIG. 8 shows schematically an image captured by the imaging device of FIG. 7.

Refer to FIG. 6 to FIG. 8; where FIG. 6 is a schematic planar view of an arrangement of an application of the composite calibration plate in calibrating the illumination uniformity of the imaging device in accordance with this disclosure, FIG. 7 is a schematic view showing that the fluorescent detection system utilizes the composite calibration plate of FIG. 6 to perform calibration of fluorescence uniformity upon the imaging device, and FIG. 8 shows schematically an image captured by the imaging device of FIG. 7.

As shown in FIG. 6 to FIG. 8, when the fluorescent sheet 5 is stacked on the light-emitting sheet 4 by being away from the control board 1, after placing the composite calibration plate 100 into the fluorescent detection device 200, the fluorescent sheet 5 can be positioned at a focus position FP of the optical imaging path, so as to perform calibration upon the imaging device 2021.

While in calibrating the imaging device 2021, the control board 1 is utilized to activate the self-luminous sources 412 of the light-emitting sheet 4 to generate the self-luminous light beams. The self-luminous light beams would firstly pass through the diffusion-lightening sheet 422, then be projected onto the fluorescent chips 52 via the fluorescent-sheet holes 511. At this time, the imaging device 2021 can capture a fluorescent image IM of the focus position FP from the optical imaging path IP.

In practice, each fluorescent chip 52 will correspond to a different position of the optical sensing element of the imaging device 2021. Because the frequency response of each position is different, coupled with the influence of lens chromatic aberration, uneven distribution of light and dark would be possible. Thus, through fluorescent images IM, the frequency response of different locations under different spectrums can be confirmed.

As described above, while in calibrating the imaging device 2021, through operating different detection channels of the fluorescent detection system of the fluorescent detection device 200, fluorescent images IM at different wavebands can be obtained to further calculate the fluorescent correction coefficients r(i,j,c), in which i and j stand for the position of image, and c stands for the waveband. Thereupon, while the fluorescent detection device 200 performs detection to obtain the corresponding fluorescent images, the fluorescent image can be calibrated by modifying the detected fluorescent images through the illumination correction coefficient k and the fluorescent correction coefficient r.

It should be noted that each fluorescent chip 52 actually corresponds to a plurality of pixels of the fluorescent image IM. For example, 9 pixels of m1×n1 correspond to a fluorescent chip 52, and 9 pixels of m2×n2 correspond to another fluorescent chip 52. In practice, the pixel range corresponding to each adjacent fluorescent chip 52 may overlap with each other.

In addition, since there is a lens (not shown in the figure) between the imaging device 2021 and the spectroscope 2022, the fluorescent image IM actually captured by the imaging device 2021 is the surface image of the fluorescent sheet 5 that is upside down, horizontally and vertically.

Figure 9:
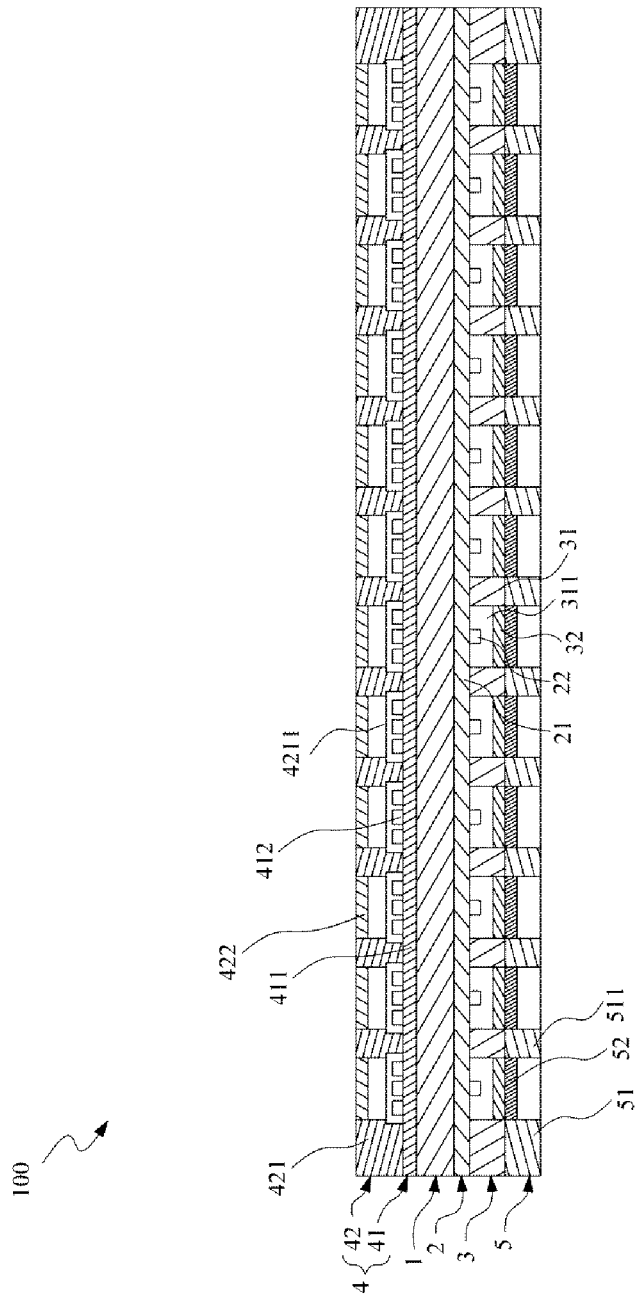
FIG. 9 is a schematic planar view of an arrangement of the composite calibration plate applied to calibrate the imaging device in a neutral-density measurement.
Figure 10:
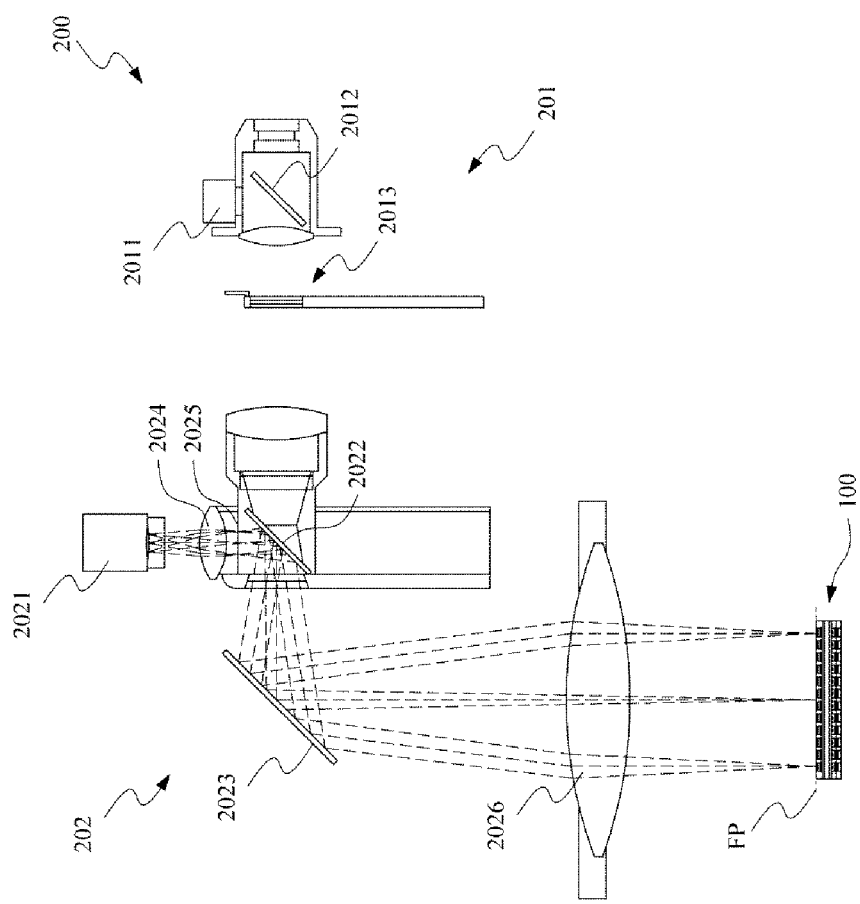
FIG. 10 is a schematic view showing that the fluorescent detection system utilizes the composite calibration plate of FIG. 9 in measuring the neutral density of the emission filter.

Refer to FIG. 9 and FIG. 10; where FIG. 9 is a schematic planar view of an arrangement of the composite calibration plate applied to calibrate the imaging device in a neutral-density measurement, and FIG. 10 is a schematic view showing that the fluorescent detection system utilizes the composite calibration plate of FIG. 9 in measuring the neutral density of emission filter.

As shown in FIG. 9 and FIG. 10, except for the calibration of the aforesaid lighting device 2011 and the imaging device 2021, the composite calibration plate 100 of this invention can be used to detect the neutral density of the emission filter 2025. When the composite calibration plate 100 is applied to measure the neutral density of the emission filter 2025, the fluorescent sheet 5 would be disposed on the diffusion board 3 by being away from the photo-detect board 2, and the light-emitting sheet 4 would be kept at the focus position FP. Thereupon, the imaging device 2021 can capture the surface image of the light-emitting sheet 4. Since the light source for the surface image on the light-emitting sheet 4 is the self-luminous light beams projected from the self-luminous sources 412, thus the control board 1 can be applied to control the self-luminous sources 412 to generate the self-luminous light beams at different wavebands, and to further measure the neutral density of the emission filter 2025.

In addition, though the composite calibration plate 100 of the aforesaid embodiments is used to measure the neutral density of the emission filter 2025 of the fluorescent detection device 200, yet, not limited thereto, the composite calibration plate 100 can be moved to other fluorescent detection devices (not shown in the figure) for examining the neutral densities of the emission filters (not shown in the figure) in these fluorescent detection devices.

In summary, compared with the previous technology that used fluorescent standard reagents for calibration, having the reagent storage problems, and even if the fluorescent minerals were used to replace the reagents, the fluorescence uniformity could not be corrected; the composite calibration plate of the present invention mainly uses a photo-detect board to detect the illumination of each built-in light source of the lighting device, and the illumination correction coefficient is further calculated. The fluorescent sheet can also be aligned with the focus position of the fluorescent detection device through different placement methods of the composite calibration plate. Thus, the fluorescent correction coefficient of each fluorescent chip can be obtained. Thereupon, the composite calibration plate provided in this invention can provide more convenience for performing calibration of illumination uniformity and fluorescence uniformity upon the fluorescent detection devices.

While the present invention has been particularly shown and described with reference to a preferred embodiment, it will be understood by those skilled in the art that various changes in form and detail may be without departing from the spirit and scope of the present invention.

What is claimed is:

1. A composite calibration plate, configured for calibrating a lighting device and an imaging device disposed inside a fluorescent detection device, the lighting device including a plurality of built-in light sources arranged in a light-source array, the composite calibration plate being disposed on an optical imaging path of the imaging device, comprising:
   a control board, having oppositely a first setting surface and a second setting surface;
   a photo-detect board, stacked on the first setting surface, connected electrically with the control board;
   a diffusion board, stacked on the photo-detect board by being away from the control board;
   a light-emitting sheet, stacked on the second setting surface, connected electrically with the control board, including a plurality of self-luminous sources arranged in the light-source array, configured for being controlled by the control board to project a plurality of self-luminous light beams; and
   a fluorescent sheet, selectively stacked on the light-emitting sheet by being away from the control board or the diffusion board, furnished with a plurality of fluorescent chips disposed according to the light-source array, configured for projecting a plurality of fluorescent light beams while being irradiated by the plurality of self-luminous light beams.

2. The composite calibration plate of claim 1, wherein the photo-detect board further includes a detect-board body and a plurality of photosensitive elements, the detect-board body is stacked on the first setting surface, the plurality of photosensitive elements are disposed on the detect-board body by being away from the control board.

3. The composite calibration plate of claim 2, wherein the diffusion board further includes a diffusion-board body and a plurality of diffusion sheets, and the diffusion-board body is stacked on the detect-board body by being away from the control board and furnished with a plurality of transparent holes; wherein, when the diffusion-board body is stacked on the detect-board body, the plurality of photosensitive elements are individually protruded correspondingly into the plurality of transparent holes, and the plurality of diffusion sheets are individually and correspondingly disposed into the plurality of transparent holes, such that, while in calibrating the lighting device, a plurality of illumination beams projected individually from the plurality of built-in light sources irradiate uniformly the plurality of photosensitive elements via the plurality of diffusion sheets.

4. The composite calibration plate of claim 1, wherein the light-emitting sheet further includes:
   a luminous layer, stacked on the second setting surface, having a plurality of self-luminous sources configured for projecting the plurality of self-luminous light beams; and
   a diffusion lightening layer, disposed on the luminous layer by being away from the control board and on individual projection paths corresponding the plurality of self-luminous light beams so as to reduce a light intensity of the plurality of self-luminous light beams and to have the plurality of self-luminous light beams to uniformly project.

5. The composite calibration plate of claim 1, wherein the fluorescent sheet further includes a fluorescent-sheet body optionally stacked on the light-emitting sheet by being away from the control board or the diffusion board with respect to the photo-detect board, and the fluorescent-sheet body is furnished with a plurality of fluorescent-sheet holes, and the plurality of fluorescent chips are individually disposed on the plurality of fluorescent-sheet holes.

6. The composite calibration plate of claim 1, wherein, while in calibrating the lighting device, the fluorescent sheet is disposed on the light-emitting sheet by being away from the control board; wherein, while in calibrating the imaging device, the fluorescent sheet is disposed on the light-emitting sheet by being away from the control board so as to have the fluorescent sheet to be located at a focus position of the optical imaging path; wherein, while in calibrating an emission filter of the lighting device, the fluorescent sheet is disposed on the diffusion board by being away from the photo-detect board so as to maintain the light-emitting sheet at the focus position.

* * * * *